(12) United States Patent
Lupsan et al.

(10) Patent No.: US 10,005,404 B2
(45) Date of Patent: Jun. 26, 2018

(54) INTEGRATED ELECTRONIC DEVICE HOLDER FOR CUP HOLDER

(71) Applicant: FORD GLOBAL TECHNOLOGIES, LLC, Dearborn, MI (US)

(72) Inventors: Adriana Lupsan, Northville, MI (US); Murali Guntur, Farmington Hills, MI (US); Peter Joseph Bejin, Northville, MI (US); Jean Waters Taylor, Dearborn, MI (US); David Steven Chronicle, Ann Arbor, MI (US)

(73) Assignee: Ford Global Technologies LLC, Dearborn, MI (US)

( * ) Notice: Subject to any disclaimer, the term of this patent is extended or adjusted under 35 U.S.C. 154(b) by 18 days.

(21) Appl. No.: 15/225,556

(22) Filed: Aug. 1, 2016

(65) Prior Publication Data
US 2018/0029537 A1 Feb. 1, 2018

(51) Int. Cl.
*B60R 11/02* (2006.01)
*B60N 3/10* (2006.01)
*B60R 11/00* (2006.01)

(52) U.S. Cl.
CPC ............. *B60R 11/02* (2013.01); *B60N 3/101* (2013.01); *B60R 2011/0007* (2013.01); *B60R 2011/0294* (2013.01)

(58) Field of Classification Search
CPC ............. B60R 11/02; B60R 2011/0007; B60R 2011/0294; B60N 3/101
See application file for complete search history.

(56) References Cited

U.S. PATENT DOCUMENTS

| 5,745,565 A | 4/1998 | Wakefield |
| 6,726,267 B2 | 4/2004 | Kim et al. |

FOREIGN PATENT DOCUMENTS

| CN | 204978436 U | 1/2016 | |
| DE | 102004045522 A1 | 3/2006 | |
| DE | 202011103180 U1 | 12/2011 | |
| JP | 2012214087 A | 11/2012 | |
| WO | WO 2014110404 A1 * | 7/2014 | ........... B60N 2/4686 |

OTHER PUBLICATIONS

English Machine Translation of CN204978436U.
English Machine Translation of DE102004045522A1.
English Machine Translation of DE202011103180U1.
English Machine Translation of JP2012214087A.
www.prweb.com, Custom Card Docks is Set to Release What is Possibly the Best iPhone Car Mount Ever Made for Convenience, Fashion and Hands-Free Safety, www.prweb.com, Mar. 7, 2016, pp. 4 of 4, http://www.prweb.com/releases/customcardocks/iphonecarmount/prweb10986919.htm.

* cited by examiner

*Primary Examiner* — Darrell G Dayoan
*Assistant Examiner* — Melissa Ann Black
(74) *Attorney, Agent, or Firm* — Vichit Chea; King & Schickli PLLC

(57) ABSTRACT

A cup holder assembly includes a door configured for translation between an open and a closed configuration, at least one receiver sidewall, and at least one first cup holder surface provided by a bottom surface of the door and configured to upwardly extend at least a portion of the receiver sidewall when the door is disposed in an open configuration. A retention system for a container is provided, including at least one container biasing member and at least one container supporting member. The container biasing member may be door-mounted or receiver sidewall-mounted.

20 Claims, 4 Drawing Sheets

INTEGRATED ELECTRONIC DEVICE HOLDER FOR CUP HOLDER

TECHNICAL FIELD

This disclosure relates generally to vehicle cup holders. More particularly, the disclosure relates to a cup holder assembly including an integrated electronic device holder.

BACKGROUND

Cup holders provide great convenience to motor vehicle users, providing a receiver for containers such as cups, glasses, etc. whereby the user need not continually hold the container in her hand to avoid spillage during motor vehicle operation. With reference to FIG. 1, the typical cup holder 100 provides at least one receiver 120 configured and dimensioned to receive and hold a container (not shown) such as a beverage container. That receiver 120 may include a structure for reducing or preventing slippage or vibration of a container held therein, being as simple as one or more rubber pads or more complex designs such as biasable mechanical fingers (not shown). A pivoting, sliding, or otherwise translatable lid or door 140 may also be provided to hide the receivers 120 when not in use.

For convenience, users often stow items other than beverage containers in the receivers 120 of a cup holder 100. For example, users may wish to set electronic devices 160 such as smartphones, cell phones, small tablet computers, etc. in a cup holder for easy access. Conventional cup holders 100 do not include suitable holders for such electronic devices, raising issues of safety and potential damage to items held loosely in a receiver 120 not dimensioned for that item.

To solve this and other problems, the present disclosure relates to a cup holder assembly for installation in a vehicle. The cup holder assembly includes an integrated holder configured to securely hold an electronic device, for example a smartphone. Advantageously, the disclosed cup holder assembly provides that holder suitably dimensioned for holding an electronic device, without occupying any of the beverage container receivers. Still further, the described holder is configured to allow access to a full central axis of the electronic device, thus allowing simple and safe actions such as powering the device on or off without removing the device from the holder.

SUMMARY

In accordance with the purposes and benefits described herein, in one aspect a cup holder assembly for a vehicle is provided, comprising at least one beverage container receiver and at least one integral electronic device holder comprising a slot dimensioned and configured for holding an electronic device. The at least one beverage container receiver is defined by at least one sidewall and a floor, and the slot comprises at least one sidewall and a floor.

In embodiments, the integral electronic device holder floor is raised relative to the beverage container floor. The slot sidewall in embodiments comprises at least one gap defined therein. In alternative embodiments, the at least one integral electronic device holder further includes a resilient electronic device retainer that imposes a biasing force on an electronic device held therein.

In other aspects, vehicle consoles and vehicles including the described cup holder assembly are provided.

In the following description, there are shown and described embodiments of the disclosed cup holder assembly. As it should be realized, the device is capable of other, different embodiments and its several details are capable of modification in various, obvious aspects all without departing from the devices and methods as set forth and described in the following claims. Accordingly, the drawings and descriptions should be regarded as illustrative in nature and not as restrictive.

BRIEF DESCRIPTION OF THE DRAWINGS

The accompanying drawing figures incorporated herein and forming a part of the specification, illustrate several aspects of the disclosed cup holder assembly, and together with the description serve to explain certain principles thereof. In the drawing.

Reference will now be made in detail to embodiments of the disclosed cup holder assembly, examples of which are illustrated in the accompanying drawing figures.

DETAILED DESCRIPTION

Figure 1:
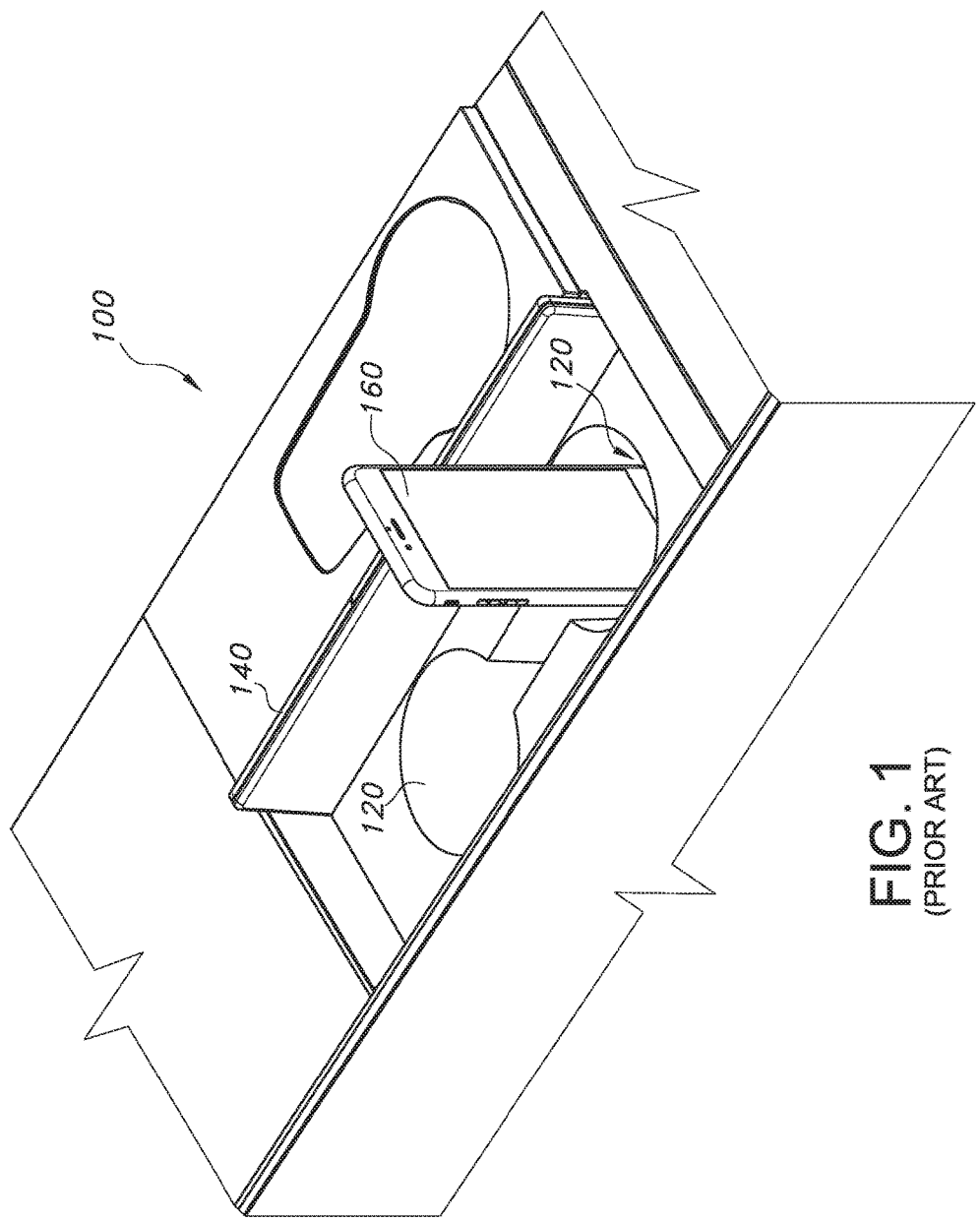
FIG. 1 depicts a prior art cup holder assembly.
Figure 2:
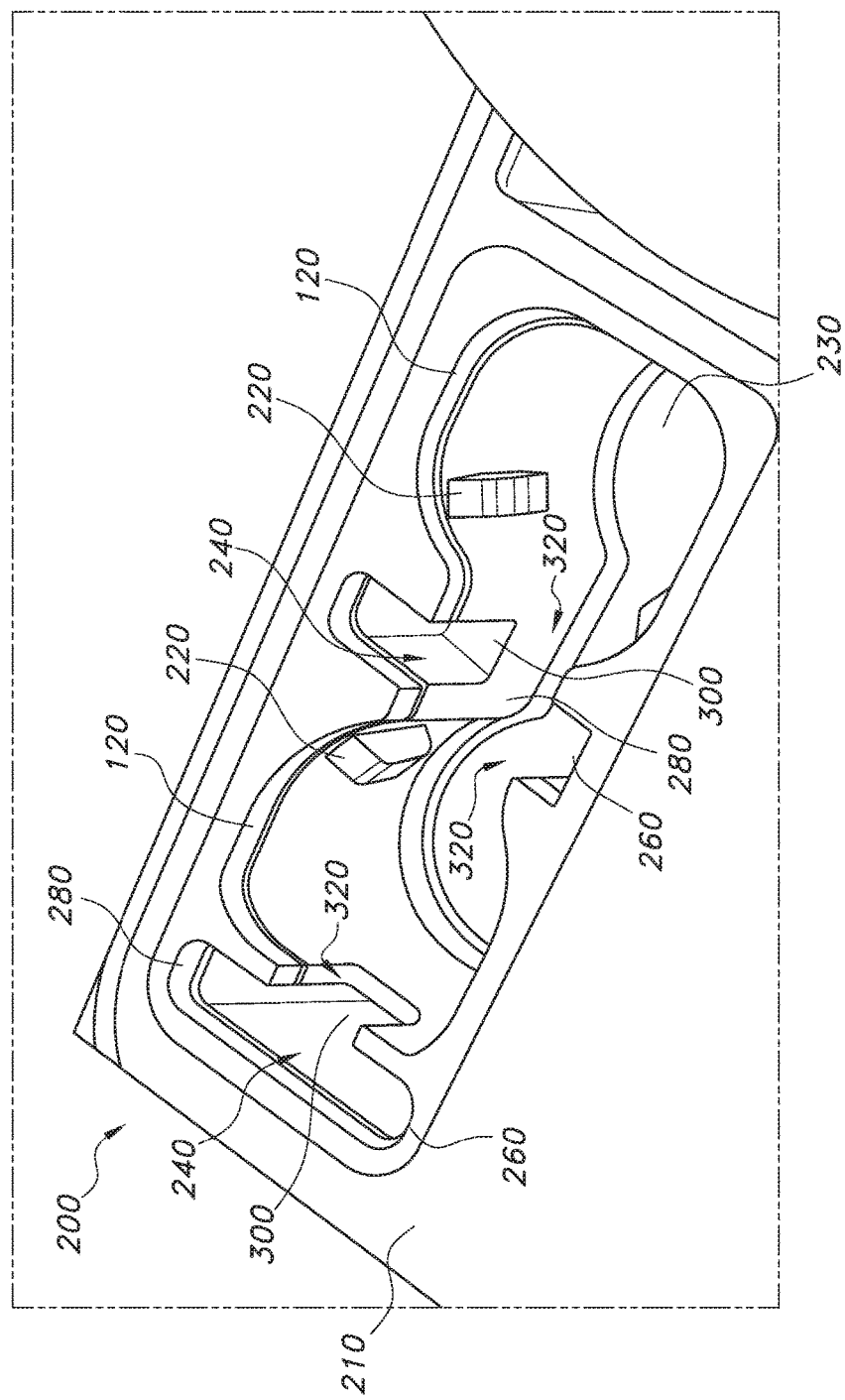
FIG. 2 shows a top plan view of a cup holder assembly according to the present disclosure.

With reference to FIG. 2, a cup holder assembly 200 incorporated into a vehicle center console structure 210 is shown including at least one receiver 120 dimensioned and configured to snugly hold a beverage container (not shown), substantially as described above. In the depicted embodiment, two such receivers 120 are provided, each including internal mechanically biasable fingers 220 to further provide snug retention of a beverage container held therein. The two receivers 120 share a common floor 230, although it is contemplated to have two discrete receivers 120 separated by an intervening wall (not shown).

As shown, the cup holder assembly 200 further includes at least one integrated holder 240, defined by a slot 260 suitably dimensioned for holding an electronic device such as a smart phone (not shown). Each slot 260 is defined by at least a side wall 280 and a floor 300. As can be seen in the drawings, the floor 300 of each slot 260 is raised relative to the receiver floor 230. As will be appreciated, this structure defines a holder 240 which holds an electronic device such as a smartphone in a raised position relative to the cup holder assembly floor 230, improving ease of access to the electronic device by a user.

Figure 3:
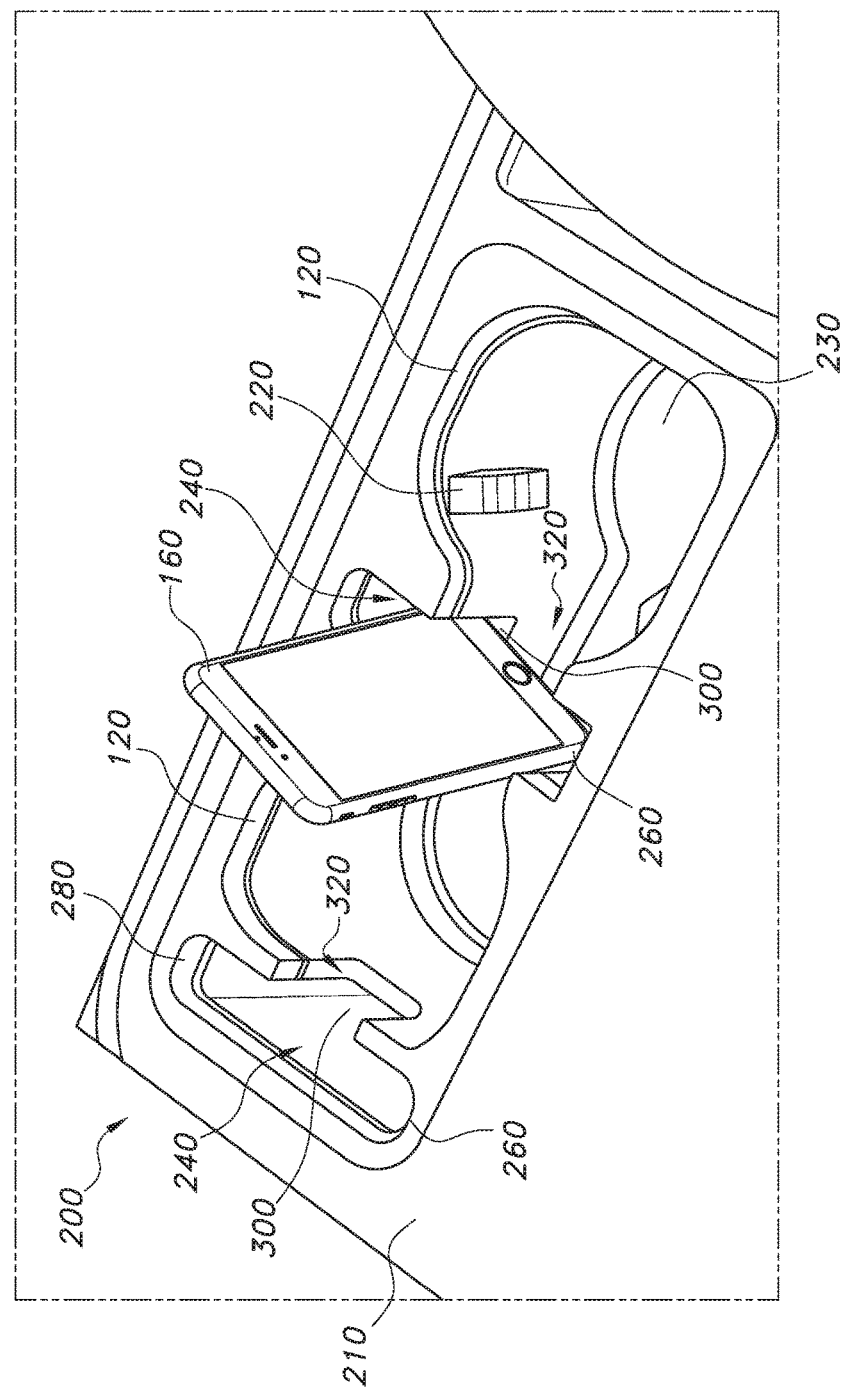
FIG. 3 shows a top plan view of the cup holder assembly of FIG. 2 holding an electronic device.

Each slot side wall 280 is interrupted by at least one gap 320 extending from a top of the side wall 280 to the receiver floor 300. In the depicted embodiment, one slot 260 includes a side wall 280 interrupted by a single gap 320, and another slot 260 includes a side wall 280 interrupted by a pair of opposed gaps 320. As will be appreciated with reference to FIG. 3, this structure allows access to a central portion of an electronic device 160 such as a smartphone, cell phone, small tablet computer, and other devices, thereby improving ease and convenience of simple and safe actions such as powering the device 160 on or off without requiring removing the device from the holder. This is so even if the electronic device 160 and one or more beverage containers (not shown) are held in the cup holder assembly 200 concurrently.

Figure 4:
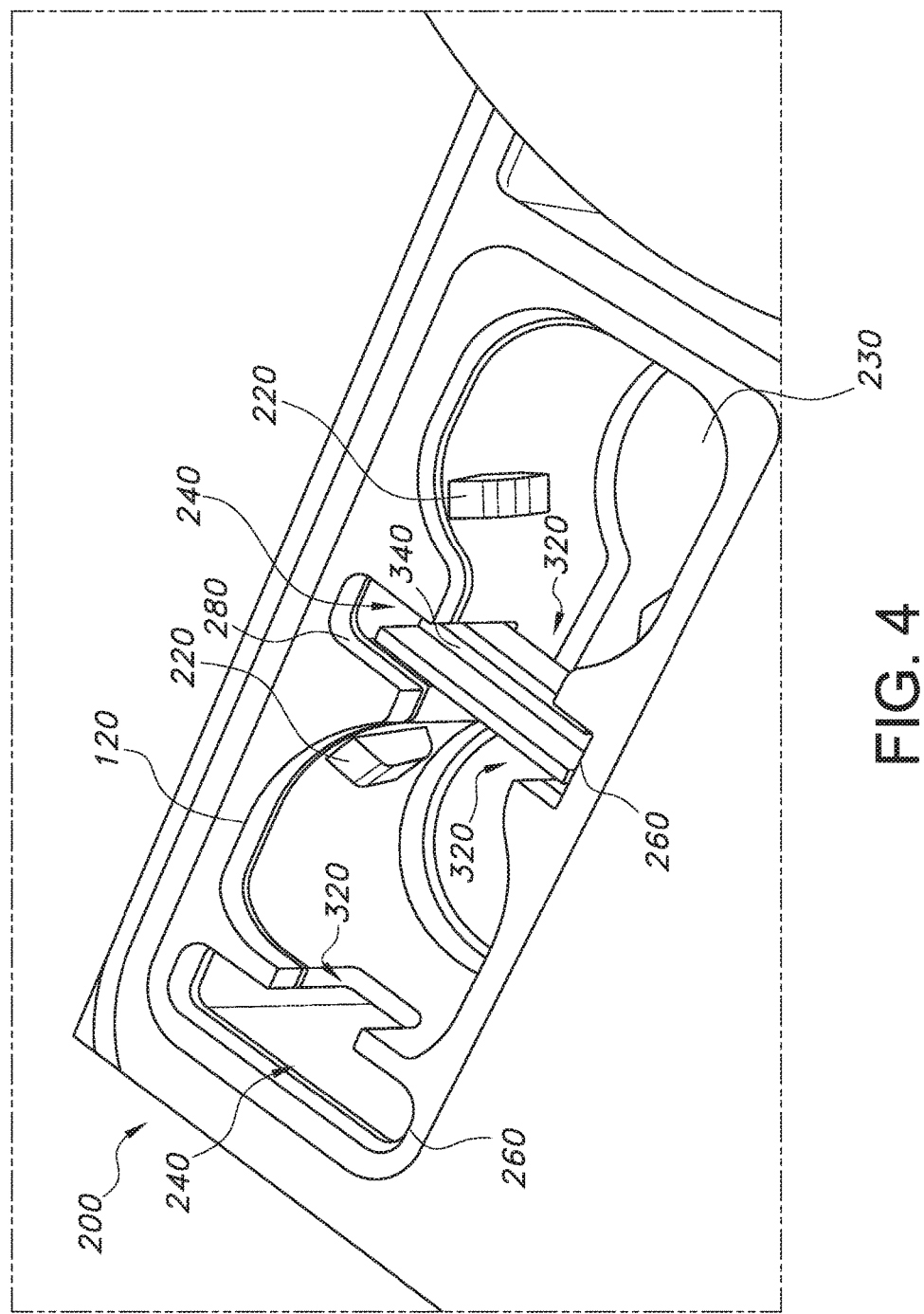
FIG. 4 shows a top plan view of an alternative embodiment of a cup holder assembly according to the present disclosure.

In an alternative embodiment shown in FIG. 4, a resilient electronic device retainer 340 is provided within each slot 260. As will be appreciated, this resilient electronic device retainer 340 provides a benefit of shock protection for an electronic device (not shown) held thereon. In turn, because the electronic device retainer 340 is resilient and compressible, slot 260 is thereby configured to hold electronic devices of a variety of thicknesses, heights, etc. Any suitable material is contemplated for fabrication of the electronic device retainer 340, including without intending any limitation suitably resilient cloths, rubbers, plastics, polymers, and others.

Obvious modifications and variations are possible in light of the above teachings. For example, the depicted embodiments of the cup holder assembly 200 show substantially cylindrical receivers 120, but alternative geometries for the receivers are possible and contemplated. Likewise, the depicted embodiments of the cup holder assembly 200 show two receivers 120 and two holders 240, but fewer or more receivers and/or holders are of course possible and contemplated. The depicted embodiments show a cup holder assembly 200 configured for installation in a vehicle center console, but alternative configurations are contemplated for installation in a vehicle door, dash panel, etc. All such modifications and variations are within the scope of the appended claims when interpreted in accordance with the breadth to which they are fairly, legally and equitably entitled.

What is claimed:

1. A cup holder assembly for a vehicle, comprising:
   at least one beverage container receiver; and
   at least one integral electronic device holder comprising a slot dimensioned and configured for holding an electronic device, the slot being defined by at least one sidewall comprising at least one gap dimensioned to provide access to at least a central axis of the electronic device held therein.

2. The assembly of claim 1, wherein the at least one beverage container receiver is defined by at least one sidewall and a floor.

3. The assembly of claim 2, wherein the slot comprises the at least one sidewall and a floor.

4. The assembly of claim 3, wherein the integral electronic device holder floor is raised relative to the beverage container floor.

5. The assembly of claim 1, wherein the at least one integral electronic device holder further includes a resilient electronic device retainer that imposes a biasing force on an electronic device held therein.

6. A vehicle console including the assembly of claim 1.

7. A vehicle including the vehicle console of claim 6.

8. The assembly of claim 2, wherein the at least one gap is defined to extend vertically from a top of the at least one sidewall to a floor of the at least one sidewall.

9. A cup holder assembly for a vehicle, comprising:
   at least one beverage container receiver defined by at least one sidewall and a floor; and
   at least one integral electronic device holder comprising a slot dimensioned and configured for holding an electronic device, the slot comprising at least one sidewall and a floor;
   further wherein the at least one sidewall comprises at least one gap dimensioned to provide access to at least a central axis of the electronic device held therein.

10. The assembly of claim 9, wherein the integral electronic device holder floor is raised relative to the beverage container floor.

11. The assembly of claim 9, wherein the at least one gap is defined to extend vertically from a top of the at least one sidewall to a floor of the at least one sidewall.

12. The assembly of claim 9, wherein the at least one integral electronic device holder further includes a resilient electronic device retainer that imposes a biasing force on an electronic device held therein.

13. A vehicle console including the assembly of claim 9.

14. A vehicle including the assembly of claim 13.

15. A vehicle console including the assembly of claim 14.

16. A vehicle including the assembly of claim 15.

17. A cup holder assembly for a vehicle, comprising:
   at least one beverage container receiver defined by at least one receiver sidewall and a receiver floor;
   at least one integral electronic device holder comprising a slot dimensioned and configured for holding an electronic device, the slot comprising at least one gapped slot sidewall and a slot floor that is raised relative to the receiver floor, the gap being dimensioned to provide access to at least a central axis of the electronic device held therein; and
   a slot-mounted resilient electronic device retainer that imposes a biasing force on the electronic device held therein.

18. The assembly of claim 17, wherein the gapped slot sidewall comprises a pair of opposed gaps.

19. The assembly of claim 17, including a pair of integral electronic device holders.

20. The assembly of claim 17, including a slot-mounted resilient electronic device retainer fabricated of one or more of a cloth, a rubber, a plastic, a polymer, and combinations.

* * * * *